United States Patent
Cleveland et al.

(10) Patent No.: US 8,032,098 B2
(45) Date of Patent: *Oct. 4, 2011

(54) MIMO RECEIVER WITH POOLED ADAPTIVE DIGITAL FILTERING

(75) Inventors: Joseph R. Cleveland, Murphy, TX (US); Eran Pisek, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1391 days.

This patent is subject to a terminal disclaimer.

(21) Appl. No.: 11/545,156

(22) Filed: Oct. 10, 2006

(65) Prior Publication Data

US 2007/0258600 A1    Nov. 8, 2007

Related U.S. Application Data

(60) Provisional application No. 60/798,429, filed on May 5, 2006.

(51) Int. Cl.
*H04B 17/02* (2006.01)

(52) U.S. Cl. ........ 455/133; 455/134; 455/140; 455/197; 375/341

(58) Field of Classification Search .................. 455/133, 455/134, 140, 197.1, 277.1, 213, 306, 307; 375/341, 335, 347, 229; 370/208

See application file for complete search history.

(56) References Cited

U.S. PATENT DOCUMENTS

| | | | | |
|---|---|---|---|---|
| 7,003,101 B2 * | 2/2006 | Seibert | | 379/406.14 |
| 7,167,511 B1 * | 1/2007 | Goren et al. | | 375/222 |
| 7,187,711 B1 * | 3/2007 | Kantschuk et al. | | 375/222 |
| 7,327,914 B1 * | 2/2008 | Kahn et al. | | 385/15 |
| 7,433,434 B2 * | 10/2008 | Gifford et al. | | 375/350 |
| 7,505,367 B2 * | 3/2009 | Abdi | | 367/134 |
| 7,509,002 B2 * | 3/2009 | Kahn et al. | | 385/15 |
| 7,634,030 B2 * | 12/2009 | Kim et al. | | 375/341 |
| 7,734,990 B2 * | 6/2010 | Maru | | 714/780 |
| 7,738,655 B2 * | 6/2010 | Sharon et al. | | 379/406.08 |
| 7,751,372 B2 * | 7/2010 | Monsen | | 370/335 |
| 2004/0037417 A1 * | 2/2004 | Seibert | | 379/406.01 |
| 2004/0105489 A1 * | 6/2004 | Kim et al. | | 375/140 |
| 2005/0195734 A1 * | 9/2005 | Sandell et al. | | 370/208 |
| 2006/0109938 A1 * | 5/2006 | Challa et al. | | 375/347 |
| 2007/0217546 A1 * | 9/2007 | Sandell et al. | | 375/299 |
| 2007/0258544 A1 * | 11/2007 | Cleveland et al. | | 375/299 |
| 2008/0069561 A1 * | 3/2008 | Kahn et al. | | 398/39 |
| 2008/0112470 A1 * | 5/2008 | Cleveland et al. | | 375/219 |
| 2009/0169220 A1 * | 7/2009 | Kahn et al. | | 398/200 |
| 2009/0279633 A1 * | 11/2009 | Lee et al. | | 375/267 |
| 2009/0282311 A1 * | 11/2009 | Lee et al. | | 714/751 |

* cited by examiner

*Primary Examiner* — Minh D Dao (57) ABSTRACT

MIMO receiver with a reconfigurable pooled digital filter is disclosed. A processor sets parameters of the filter to minimize the number of instructions per second and the amount of power required by the filter to perform, while matching the filter to a transmitter filter. The processor uses an algorithm or a lookup table stored in memory to select the combination of filter parameters. The parameters may be selected from at least one of: a number of taps, a filter length, a word length, a coefficient quantization, a sampling rate, bits per sample, a sampling bit, a tap delay and a coefficient length. After selecting a combination of filter parameters, the processor sends a control signal to the adaptive filter. The pooled adaptive filter reconfigures itself in accordance with the selected filter parameters.

16 Claims, 6 Drawing Sheets

MIMO RECEIVER WITH POOLED ADAPTIVE DIGITAL FILTERING

CROSS-REFERENCE TO RELATED APPLICATION AND CLAIM OF PRIORITY

The present application is related to U.S. Provisional Patent No. 60/798,429, filed May 5, 2006, entitled "MIMO RECEIVER WITH POOLED ADAPTIVE DIGITAL FILTERING THAT REDUCES SIGNAL PROCESSING". U.S. Provisional Patent No. 60/798,429 is assigned to the assignee of the present application and is hereby incorporated by reference into the present disclosure as if fully set forth herein. The present application hereby claims priority under 35 U.S.C. §119(e) to U.S. Provisional Patent No. 60/798,429.

TECHNICAL FIELD OF THE INVENTION

The present application relates generally to wireless communication networks and, more specifically, to multiple input, multiple output (MIMO) receiver systems.

BACKGROUND OF THE INVENTION

Modern communications demand higher data rates and performance. Multiple input, multiple output (MIMO) antenna systems, also known as multiple-element antenna (MEA) systems, achieve greater spectral efficiency for allocated radio frequency (RF) channel bandwidths by utilizing space or antenna diversity at both the transmitter and the receiver.

MIMO receivers typically include fixed pulse-shaping filters such as, for example, root-raised cosine (RRC) or finite impulse response (FIR) filters. Such filters are designed to provide most of the channel-selection filtering in the digital domain. Thus, such filters eliminate the need for an intermediate frequency (IF) stage, but increase inter-chip interference (ICI) for low selectivity.

There is therefore a need for efficient receiver filters for use in MIMO systems. More particularly, there is a need for reconfigurable digital filters for MIMO receivers that reduce processing power and power dissipation for multiple MIMO streams.

SUMMARY OF THE INVENTION

The present disclosure provides a technique for pooled adaptive digital filtering to reduce signal processing requirements.

In one embodiment, a method for providing adaptive digital filtering is disclosed. The method includes selecting a combination of filter parameter values according to a channel estimation algorithm. The method also includes configuring a filter according to the combination of filter parameter values and a transmitter filter. The method further includes matching the filter to a transmitter filter.

In another embodiment, a multi-input, multi-output (MIMO) receiver filter for use in a wireless communication system is disclosed. The MIMO receiver filter includes a processor to select a combination of filter parameter values according to signal strength information from an automatic gain control module and to match the MIMO receiver filter to a MIMO transmitter filter. The MIMO receiver filter also includes a reconfigurable filter pool to filter a signal according to the combination of filter parameters.

In still another embodiment, a receiver filter for use in a multi-input, multi-output (MIMO) system is disclosed. The receiver filter includes a processor to select a combination of filter parameter values according to a channel estimation algorithm and to match the receiver filter to a MIMO transmitter filter. The receiver filter also includes a reconfigurable filter pool to filter a received MIMO stream according to the combination of filter parameters.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
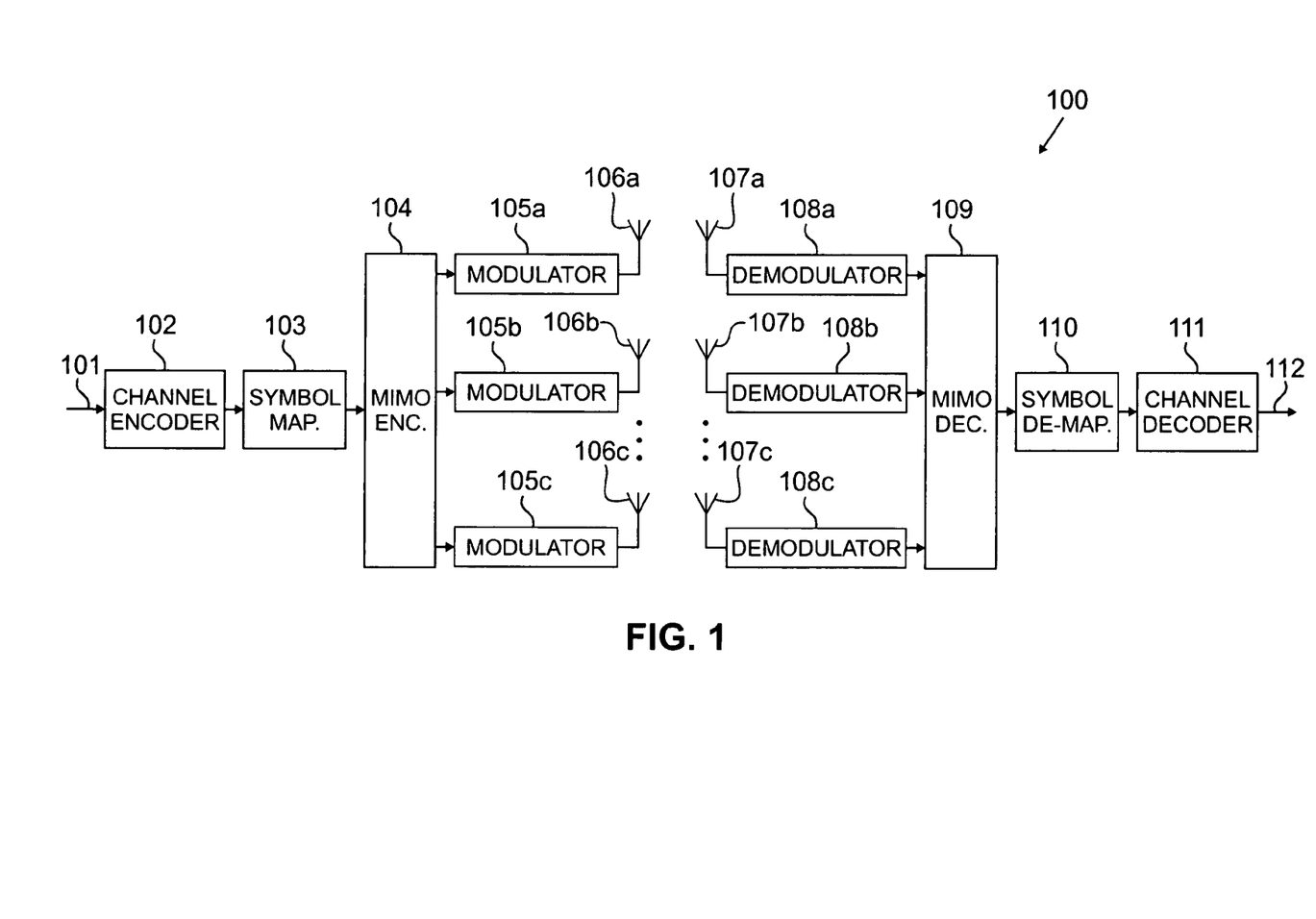
FIG. 1 illustrates a conventional multiple input, multiple output (MIMO) system.

FIG. 1 illustrates a conventional multiple input, multiple output (MIMO) system 100. Input data stream 101 from a single user is encoded by channel encoder 102. After passing the encoded signal through symbol mapping module 103, the signal is passed to MIMO encoder 104. MIMO encoder 104 demultiplexes the signal into $n_T$ separate sub-streams. Each of the $n_T$ substreams are fed into one of modulators 105a, 105b and 105c (collectively referred to herein as modulator 105). Each of the $n_T$ substreams are transmitted out of one of transmit antennas 106a, 106b and 106c (collectively referred to herein as transmit antenna or transmitter 106), where each transmit antenna is associated with a respective modulator 105.

Each sub-stream transmitted by transmitter 106 is received by one of $n_R$ receive antennas 107a, 107b and 107c (collectively referred to herein as receive antenna or receiver 107). Each receive antenna or receiver 107 is coupled to one of demodulator 108a, 108b and 108c (collectively referred to herein as demodulator 108). Each sub-stream is decoded in MIMO decoder 109 then encoded into channel symbols in symbol de-mapping module 110 and channel decoder 111. The same data rate may be implemented on each transmitter 106. Different adaptive modulation rates, however, may be utilized on each of the $n_T$ sub-streams.

With this transmission scheme, MIMO system 100 exhibits a linear increase in spectral efficiency. MIMO system 100 includes a rich scattering environment where the signals from each individual transmitter 106 appear highly uncorrelated at each receiver 107. The signals corresponding to each of the $n_T$ transmitters 106 attain different spatial signatures at each of the $n_R$ receivers 107 when the signals are conveyed through uncorrelated channels between transmitter 106 and receiver 107. Receiver 107 may use different spatial signatures to simultaneously separate the signals that originate from a different transmitter 106 at the same frequency. Thus, the filtering requirements for each signal stream are not necessarily identical.

To minimize inter-symbol interference (ISI) and adjacent channel interference for each signal stream, the same digital filter processing is not required. Conventional adaptive filtering reduces the processing complexity on single received signals, but does not reduce the processing or hardware required for filtering multiple received signal streams, each with a different signature as required in MIMO system 100.

Receiver 107 may include a filter (not shown) generally having several conflicting attributes such as, for example: (1) a low bandwidth; (2) low ISI; (3) low noise figure; (4) high adjacent channel interference rejection; and (5) low power consumption. Conventional receivers 107 fail to include optimized filters for a combination of particular signal waveforms, emission constraints, noise, adjacent channel interference and anticipated propagation channels optimizing conventional transmitter-to-receiver chain performance is often hindered by the complex relationship between the symbol waveform, the transmitter and receiver filter shapes and the received bit error rate (BER).

Receive filtering in, for example, cellular receivers such as those in code division multiple access (e.g., CDMA2000), Wideband Code Division Multiple Access (WCDMA), IEEE 802.16d/e (e.g., Worldwide Interoperability for Microwave Access (WiMAX)), Third Generation Partnership Project Long Term Evolution (3GPP LTE) and High-Speed Downlink Packet Access (HSDPA)/High-Speed Uplink Packet Access (HSUPA), is usually partially performed in analog circuits at the front-end and in digital circuits at the back-end. Conventional methods have also used digitized receiver architectures using channel-selection filtering in the digital domain. For example, some conventional methods use a direct conversion receiver, such as "zero-IF" receiver or direct conversion receiver 200, shown in FIG. 2.

Figure 2:
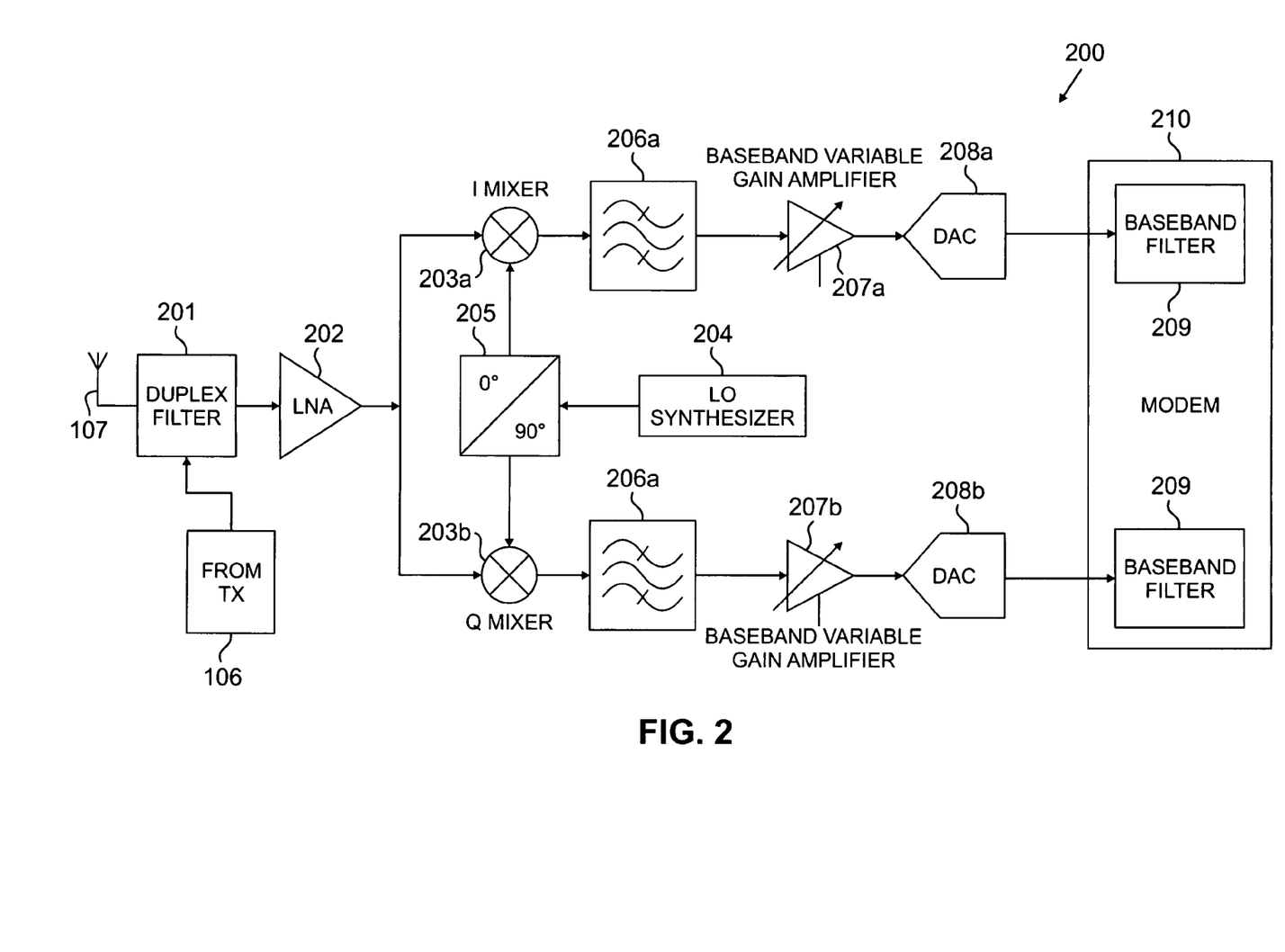
FIG. 2 illustrates a conventional direct conversion receiver.

Direct conversion receiver 200 includes a duplexer or duplex filter 201 with two inputs. The first input is from antenna 107 and the second input is from transmitter 106. The output of duplex filter 201 is passed to a low noise amplifier (LNA) 202. The output of LNA 202 is passed to a quadrature mixer comprised of an I-component mixer 203a and a Q-component mixer 203b. The input of I-component mixer 203a and Q-component mixer 203b are mixed with a signal generated by local oscillator (LO) synthesizer 204 and shifted by ninety degree phase shifter 205.

The output of I-component mixer 203a is passed through a band pass filter 206a and then through baseband variable gain amplifier 207a. Finally, the output from baseband variable gain amplifier 207a is passed through a digital-to-analog converter (DAC) 208a and sent to baseband filter 209a in modem 210.

Similarly, the output of Q-component mixer 203b is passed through a band pass filter 206b and then through baseband variable gain amplifier 207b. Finally, the output from baseband variable gain amplifier 207b is passed through a digital-to-analog converter (DAC) 208b and sent to baseband filter 209b in modem 210. By eliminating the intermediate frequency (IF) stage in direct conversion receiver 200, there is no longer a need for performing surface acoustic wave (SAW) filtering or for using an IF synthesizer and mixer. Using this methodology, however, all receive filtering takes place in either the analog or digital baseband stages.

Conventional receive filtering in wireless terminals or base transceiver station (BTS) should serve two main purposes. First, receive filtering performs raised root cosine (RRC) filtering to mitigate inter-chip interference (ICI) or ISI. Second, receive filtering provides selectivity to operate in the presence of strong interference. The receiver filter is typically matched to the transmitter RRC filter. In addition, as a worst case interference scenario, a terminal must be able to operate in conformance with certain industry tests in, for example, Universal Mobile Telecommunications System (UMTS) and CDMA2000. However, strong interference is not always present in practice, thus it is desirable to allow for selectivity based on the measured amount of interference.

Conventional applications of adaptive digital receive filter structures typically reduce the number of filter taps and filter coefficients when less selectivity is required. Although the number of required operations per filtered sample is reduced, conventional methods increase ICI for low selectivity. Other conventional methods use modified adaptive digital receive filter structures using optimized sets of filter coefficients with different lengths for a range of selectivity requirements. However, the filter structure often becomes complex and needs to store and load the sets of filter coefficients.

Figure 3:
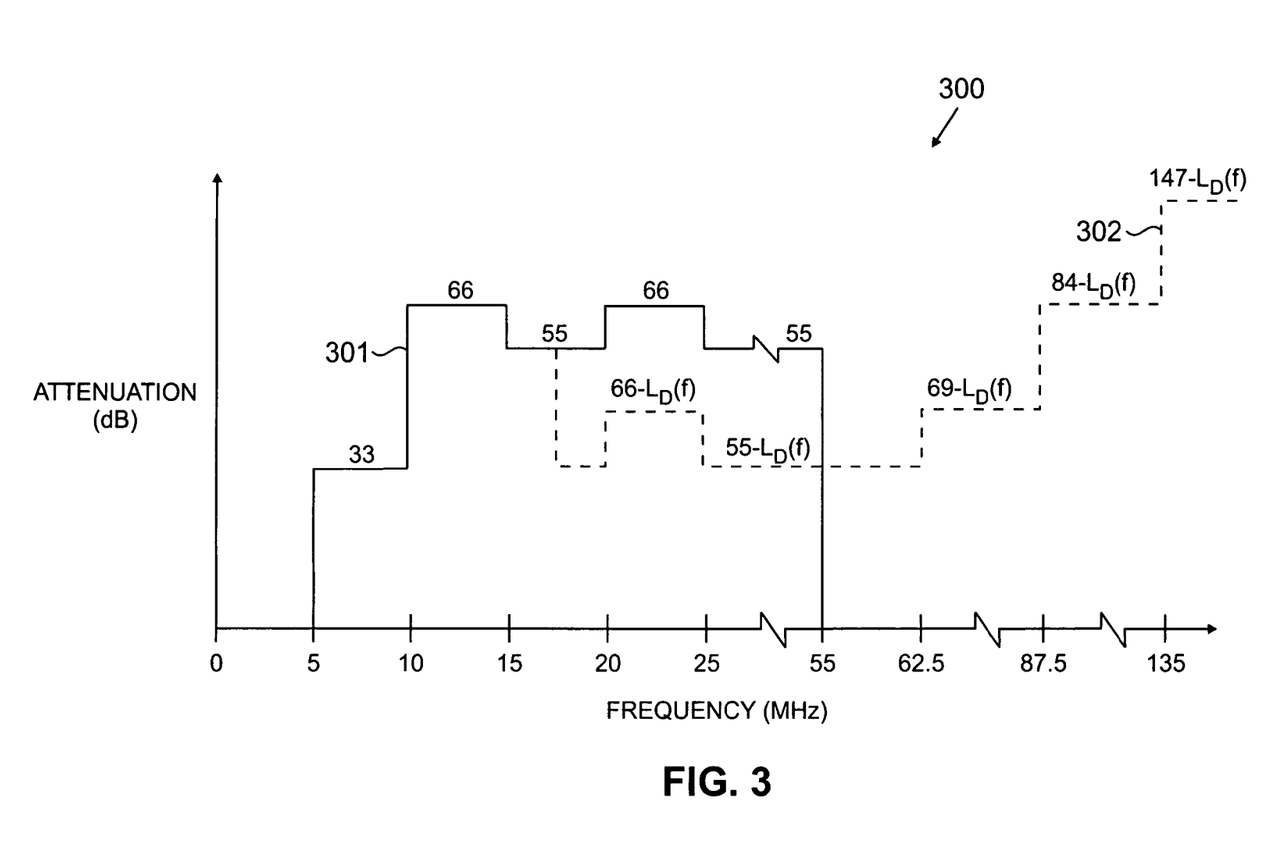
FIG. 3 illustrates a worst case selectivity requirement for an Universal Mobile Telecommunications System (UMTS) receiver as a function of the frequency offset from the center frequency of a desired channel.

FIG. 3 illustrates the worst case UMTS receiver selectivity requirements 300 for adjacent channel selectivity, in-band and out-of-band blocking and intermodulation as a function of the frequency offset from the center frequency of the desired channel. The selectivity requirement within the UMTS downlink band 301 is illustrated as a solid line in FIG. 3, while the out-of-band requirement 302 is illustrated as a dashed line. $L_D(f)$ represents duplexer attenuation for a given frequency determined by the out-of-band duplexer attenuation ($L_{DUP}(f)$) and the in-band duplexer loss ($L_{DUP}$). In highly digitized receiver architectures, the in-band selectivity requirements are satisfied based solely on the digital channel-selection filter. Thus, the digital channel-selection filter will need to provide a stop-band attenuation of 33 dB at a frequency offset of 5 MHz and a stop-band attenuation of 66 dB at frequency offsets of 10 MHz or higher. Moreover, because the entire UMTS downlink signal band 301 has to be converted to the digital domain, a stringent demand on the sampling frequency and dynamic range of the analog-to-digital converter (ADC) exists. For example, in an ADC with a sampling frequency of 153.6 MHz (i.e., 40×chip rate of 3.84 MHz), a dynamic range of more than 66 dB is required.

Figure 4:
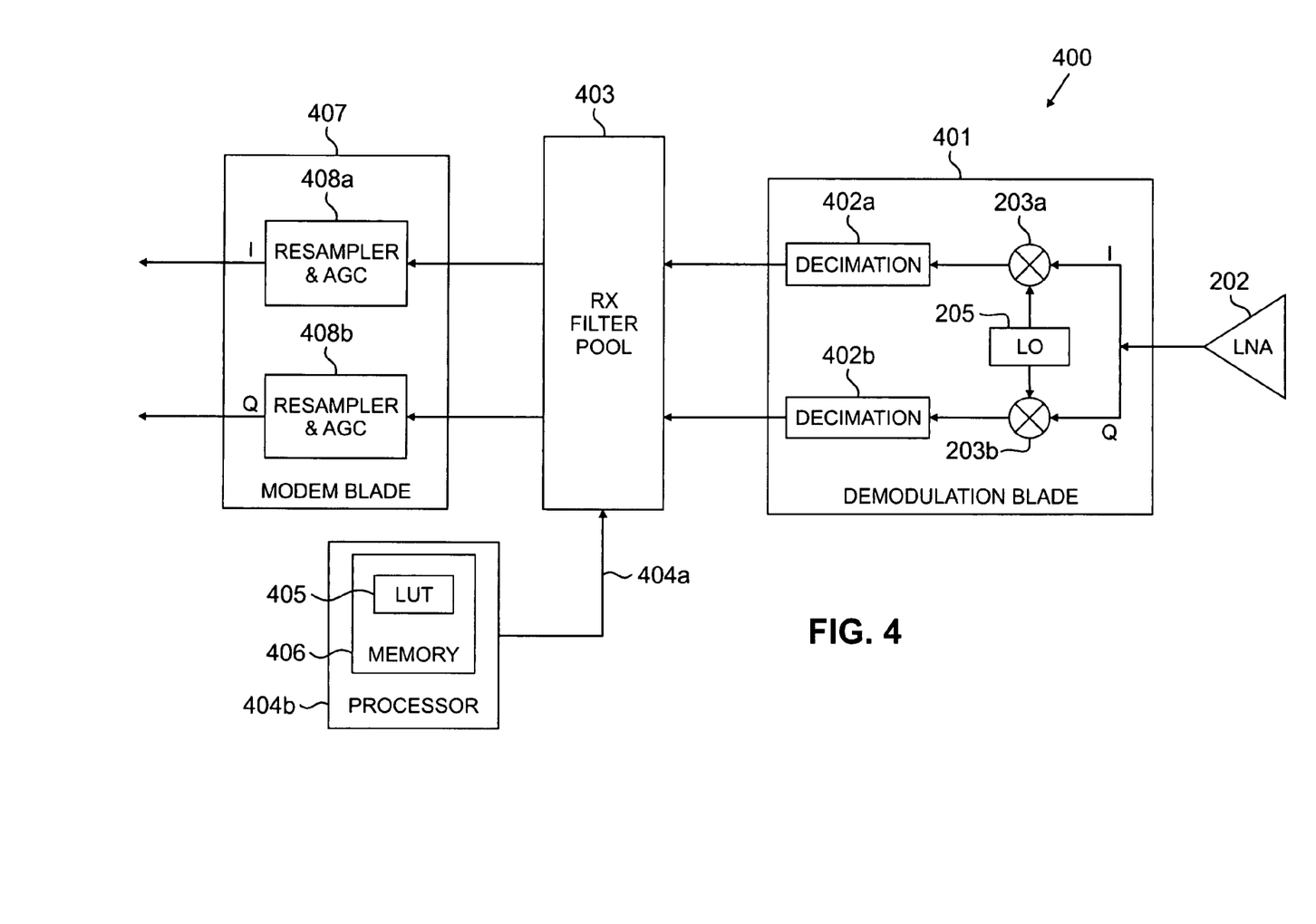
FIG. 4 illustrates the reconfigurable architecture of a pooled digital filter for a wireless MIMO receiver according to one embodiment of the present disclosure.

FIG. 4 illustrates the reconfigurable architecture of pooled digital filter 400 for use in a wireless MIMO receiver according to one embodiment of the present disclosure. The signal output from LNA 202 (described earlier in conjunction with the description accompanying FIG. 2) is passed to an I-component mixer 203a and a Q-component mixer 203b included in modem demodulation blade 401 and are demodulated. Although FIG. 4 depicts only one modem blade 401, it should be understood that any suitable number of modem blades 401 may be used in accordance with the present disclosure. Thus, embodiments of the present disclosure may simultaneously process several signals at any given time.

The input of I-component mixer 203a is mixed with a signal generated by LO synthesizer 205. Similarly, the input of Q-component mixer 203b is mixed with a signal generated by LO synthesizer 205. The output of I-component mixer 203a is passed through decimation filter 402a and passed along to receiver filter pool 403. Similarly, the output of Q-component mixer 203b is passed through decimation filter 402b and passed along to receiver filter pool 403.

Receiver filter pool 403 processes the signal from decimation filter 402a and 402b using a control signal 404a from reconfigurable processor or digital signal processor 404b. Processor 404b may be any suitable reconfigurable processor or part of any suitable reconfigurable processor. Digital filter 400 may include any suitable programmable architecture.

Processor 404b uses an algorithm or a lookup table 405 stored in memory 405 to select the combination of number of taps (filter length), the word length (bits per sample), tap delay and coefficient length to minimize the number of instructions per second and the amount of power consistent with minimizing the adjacent channel interference and the ISI for the waveform being transmitted. The size of receiver filter pool 403 is chosen to provide enough processing for the average receiver filter pool plus a predefined margin. The receiver filter pool requirement preferably ensures that requirements for all MIMO streams are met a desired percentage of the time. In addition, processor 404b may include MIMO transmitter matching information in control 404a.

The parameters of digital filter 400 are set to minimize the number of instructions per second and the amount of power required by digital filter 400 to perform its operation based on the output of the channel estimation algorithm in the modem or the signal strength from resampler and automatic gain control (AGC) modules 408a and 408b found in modem blade 407. Although FIG. 4 depicts only one modem blade 407, it should be understood that any suitable number of modem blades 407 may be used in accordance with the present disclosure. Thus, digital filter 400 may simultaneously process several signals at any given time.

According to one embodiment of the present disclosure, digital filter 400 automatically adjusts filter parameters (i.e., number of taps or filter length, word length, coefficient quantization, sampling rate, tap delay, sampling bits, etc.) based on signal waveform characteristics. The adjustments provide adjacent channel rejection and meet bit error rate or symbol error rate requirements. The adjustments also preferably match digital filter 400 to any known transmitter pulse-shaping filters.

Accordingly, digital filter 400 reduces processing power and power dissipation for multiple receiver MIMO streams of modulation symbols. Digital filter 400 may be used in any suitable wireless network such as, for example, systems employing CDMA, WCDMA, orthogonal Frequency Division Multiplexing (OFDM), Orthogonal Frequency Division Multiple Access (OFDMA) technologies, or the like.

Figure 5:
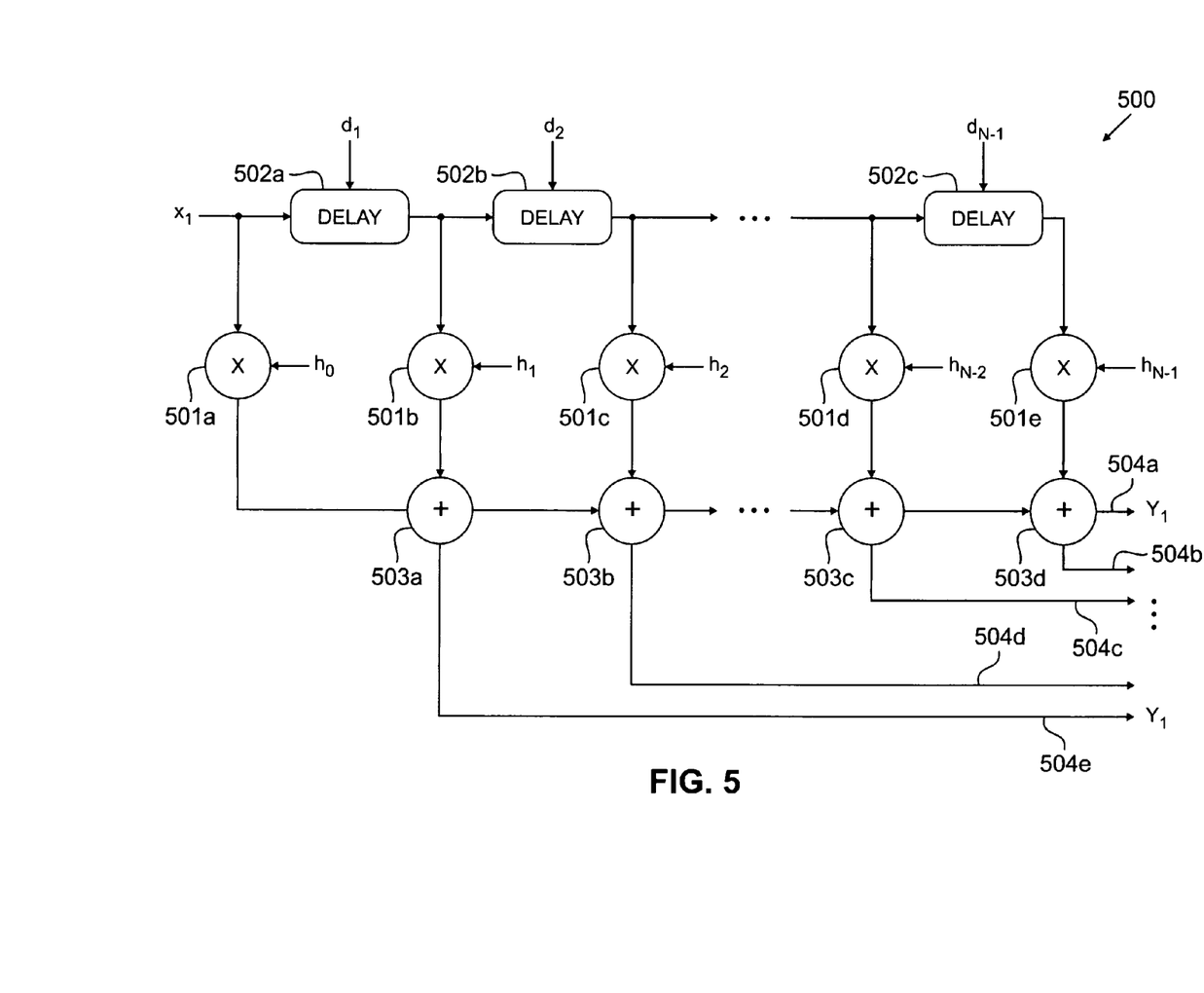
FIG. 5 illustrates an adaptive finite impulse response (FIR) filter in accordance with one embodiment of the present disclosure.

FIG. 5 illustrates reconfigurable FIR filter 500 in accordance with one embodiment of the present disclosure. FIR filter 500 includes tap coefficient set $\{h_0, h_1, \ldots, h_{N-1}\}$ 501a, 501b, 501c, 501d and 501e (collectively referred to herein as tap coefficient set 501). Although only five tap coefficient sets 501 are shown in FIG. 5, any suitable number of tap coefficient sets 501 may be used in accordance with the present disclosure. FIR filter 500 also includes a delay set $\{d_1, \ldots, d_{N-1}\}$ 502a, 502b and 502c (collectively referred to herein as delay set 502). Although only three delay sets 502 are shown in FIG. 5, any suitable number of delay sets may be used in accordance with the present disclosure.

FIR filter 500 further includes tap output set $\{Y_1, \ldots, Y_{N-1}\}$ 503a and 503b (collectively referred to herein as tap output set 503). Although four tap output sets 503 are shown in FIG. 5, any suitable number of tap output sets 503 may be used. As described earlier, processor 404 sets the delay parameters and the tap coefficients and accordingly produces a processor control signal 404a. In one embodiment, the number of taps used is determined by the selection of the respective output port 504a, 504b, 504c, 504d and 504e (collectively referred to herein as output port 504) from tap output set $\{Y\}$ 503. Although five output ports 504 are shown in FIG. 5, any suitable number of output ports may be used.

Figure 6:
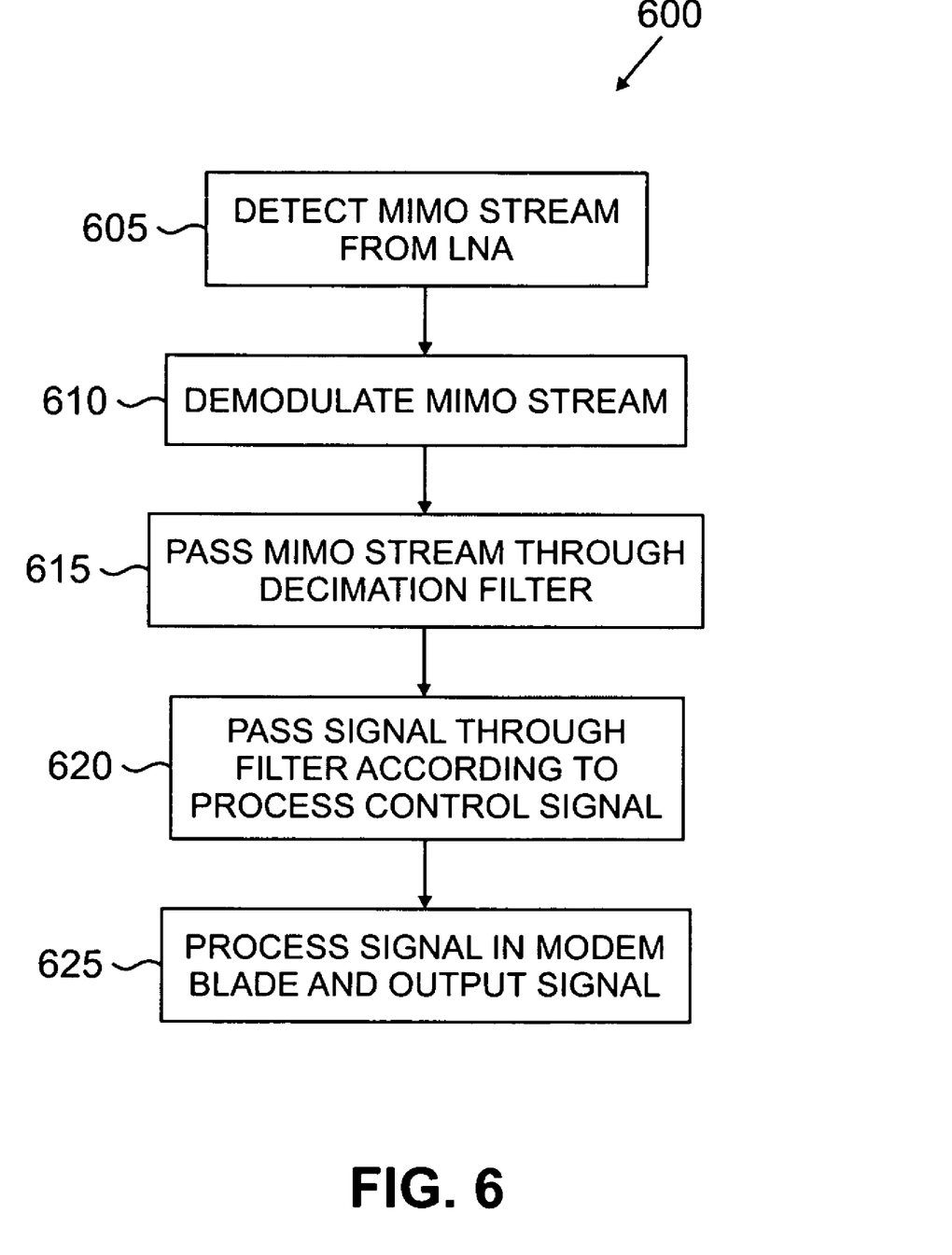
FIG. 6 is a somewhat simplified flow chart illustrating a method for filtering a MIMO system receiver in accordance with one embodiment of the present disclosure.

FIG. 6 is a somewhat simplified flow chart illustrating method 600 for pooled-filtering of signals in a MIMO receiver. In step 605, the signal output from a low noise amplifier, such as LNA 202 (described earlier in conjunction with the description accompanying FIG. 2), is detected by digital filter 400. The signal is passed to an I-component mixer, such as I-component mixer 203a, and a Q-component mixer, such as Q-component mixer 203b in step 610. The input of I-component mixer 203a is mixed with a signal generated by local oscillator, such as LO synthesizer 205. Similarly, the input of Q-component mixer 203b is mixed with a signal generated by LO synthesizer 205.

In step 615, the mixed output of I-component mixer 203a is passed through a decimation filter, such as decimation filter 402a, and passed along to a reconfigurable receiver filter pool, such as receiver filter pool 403. Similarly, the mixed output of Q-component mixer 203b is passed through a decimation filter, such as decimation filter 402b, and passed along to receiver filter pool 403.

In step 620, receiver filter pool 403 processes the signal according to a process control signal, such as process control signal 404a. Process control signal 404a selects the various process control or filter parameters according to predetermined criteria such as, for example, ISI, power consumption of the reconfigurable filter pool and the number of instructions performed by receiver filter pool 403. The predetermined criteria may be referenced from a lookup table, such as look up table 405, stored in memory 406. The predetermined criteria may be met by selecting a combination of parameters such as, for example, a number of taps, a filter length, a word length, a coefficient quantization, a sampling rate, bits per sample, a sampling bit, a tap delay and a coefficient length. Process control signal 404a may also include MIMO transmitter matching information. The signal is then processed in a modem blade, such as modem blade 406, in step 625, using a resampler and automatic gain control module, such as resampler and AGC module 408a and 408b.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless receiver, a method for providing adaptive digital filtering comprising:
   selecting a combination of filter parameter values in a receiver filter pool according to a channel estimation algorithm, the receiver filter pool operable to process received signals;
   configuring a reconfigurable adaptive filter according to the combination of filter parameter values and a transmitter filter; and
   matching the reconfigurable adaptive filter to a transmitter filter.

2. The method of claim 1, wherein selecting the combination of filter parameter values minimizes inter-symbol interference.

3. The method of claim 1, wherein the selecting the combination of filter parameter values minimizes adjacent channel interference.

4. The method of claim 1, wherein selecting the combination of filter parameter values minimizes power consumption of a filter.

5. The method of claim 1, wherein selecting the combination of filter parameter values minimizes the number of instructions performed by a filter.

6. The method of claim 1, wherein selecting the combination of filter parameter values is accomplished using a lookup table.

7. The method of claim 1, wherein the filter parameter values are at least one of: a number of taps, a filter length, a word length, a coefficient quantization, a sampling rate, bits per sample, a sampling bit, a tap delay and a coefficient length.

8. The method of claim 1, wherein the filtering achieves a desired efficiency.

9. The method of claim 1, wherein the reconfigurable adaptive filter comprises a reconfigurable digital signal processor.

10. The method of claim 1, wherein the receiver is a multi-input, multi-output (MIMO) receiver.

11. For use in a multi-input, multi-output (MIMO) system, a receiver filter comprising:
    a processor to select a combination of filter parameter values according to a channel estimation algorithm and to match the receiver filter to a MIMO transmitter filter; and
    a reconfigurable adaptive filter pool to filter a received MIMO stream according to the combination of filter parameters.

12. The filter of claim 11, wherein the combination of filter parameter values minimizes at least one of an inter-symbol interference, a power consumption of the reconfigurable filter pool, an adjacent channel interference and a number of instructions performed by the reconfigurable adaptive filter pool.

13. The filter of claim 11, wherein the processor selects the combination of filter parameter values using a lookup table.

14. The filter of claim 11, wherein the filter parameter values are at least one of: a number of taps, a filter length, a word length, a coefficient quantization, a sampling rate, bits per sample, a sampling bit, a tap delay and a coefficient length.

15. The filter of claim 11, wherein the combination of filter parameter values achieves a desired efficiency.

16. The filter of claim 11, wherein the reconfigurable adaptive filter pool comprises a pool of reconfigurable digital signal processors.

* * * * *